Patented Oct. 11, 1949

2,484,434

UNITED STATES PATENT OFFICE 2,484,434

METHOD OF MAKING SPONGE RUBBER

Edward C. Van Buskirk and Paul V. Butsch, South Bend, Ind., assignors to United States Rubber Company, New York, N. Y., a corporation of New Jersey No Drawing. Application December 21, 1946, Serial No. 717,802

6 Claims. (Cl. 260—2.5)

This invention relates to the production of sponge rubber, and more particularly to a method of making sponge rubber from natural or synthetic rubber latex or both.

It is well known that sponge rubber articles may be made by compounding natural or synthetic rubber latex with certain ingredients, such as vulcanizing agents, accelerators, foaming agents, stabilizers, then whipping the latex into a foam, subsequently adding a sensitizing agent such as zinc oxide and a gelling agent such as a silicofluoride to the foamed latex in carefully controlled quantity, shaping the foam as by pouring it into a mold, allowing the foam to gel by permitting it to rest at room temperature or accelerating the rate of gel by heat, and finally vulcanizing the article. In practicing this known process, it has been necessary to withhold the introduction of both the final two compounding ingredients, i. e. the zinc oxide and the sodium silicofluoride until after the foaming has taken place, because the presence of zinc oxide in the latex gives rise to the production of zinc divalent ions, particularly in the presence of ammonia, which induce coagulation of the latex, and the silicofluoride salt by metathesis yields fluosilicic acid which also is a powerful latex coagulant. When either the zinc oxide or the silicofluoride was added to the latex prior to whipping it, a foam of the desired light density, such as required for mattresses, seat cushions, etc., was not obtained because the foam coagulated or gelled upon the agitation occasioned by the whipping before there was an opportunity to whip the latex into a foam sufficiently light or fluffy to make a sponge rubber product having the desired characteristics of softness and even texture. When the process described is carried out commercially on a continuous basis, it requires delicate and meticulous metering operations for the introduction of the required amounts of sensitizing and gelling agents after the foam has been whipped to the desired density. The quantities of zinc oxide and of silicofluoride are highly critical, since when they are added concurrently they control precisely the time allowed for manipulative operations after formation of the foam and before the foam begins to coagulate or gel. Slight errors or variations in the measurement of the quantity of gelling agents give rise to wide changes in manufacturing time.

It has also been proposed to make sponge rubber for shoe soles by first adding mineral oil together with zinc oxide to the unbeaten latex, then whipping the latex, and finally adding sodium silicofluoride to gel the sponge. The resulting sponge, however, has density higher than .15 gram per cubic centimeter, is tough and is suitable only for such uses as shoe soles, and when attempts are made to further whip the latex to reduce the density of the foam, local coagulation takes place, the foam begins to break down, and the resulting sponge is lacking in homogeneity or lightness.

The present invention provides a method by which the zinc oxide may be added to the latex compound in the desired amount prior to frothing the latex: thereby requiring the addition to the foam, after frothing, of only the requisite amount of gelling agent, such as a silicofluoride. The delicate metering operation, particularly in a continuous process, which is required in the final additive compounding stage after formation of the foam is thereby simplified, since only one ingredient, i. e. the silicofluoride, is then introduced. Consequently the opportunity for errors in measurement are reduced and the process is more simple and direct than heretofore possible. Furthermore, with the present invention, latex foam having density of .15 gm. per cu. cm. or less may be obtained.

According to the present invention, the latex may be completely compounded, including the zinc oxide, prior to the foaming of the latex except for the addition of the silicofluoride. During the whipping or beating operation whereby the latex is converted to a foam, the compound is stabilized against the normal coagulating action of the zinc oxide, thus permitting sufficient time for the latex to be whipped to the proper light density and imparting to the latex foam, and hence to the final sponge rubber product, a smooth, even, and homogeneous texture. In practicing the invention, premature coagulation of the zinc oxide-containing compound is prevented by the addition to the latex of a sequestering agent for polyvalent zinc ions, the pH is kept high, and the ammonia, if present, is kept at a minimum. In practicing the invention with certain latices, especially those containing 50% or more of natural rubber based on the total solids content, it has been found necessary to add to the latex compound a castor oil soap in addition to the above ingredients. Although it is not the preferred embodiment of this invention, the foam may be prepared prior to the addition of the zinc oxide, and the desired amount of zinc oxide added thereafter but before addition of the silicofluoride, but when this practice is followed, the sequestering agent should be present prior to or at least simultaneously with the zinc oxide, the ammonia content should be maintained at between .1 and .5 percent by weight of the solids content of the latex, preferably below .2%, and the pH maintained at a value of at least 10, preferably from about 10.8 to 11.5, while the zinc oxide is present. The foamed latex then remains stable until the silicofluoride is added, after which the thus sensitized latex foam is poured into molds and coagulation or gelling is permitted to ensue. We have discovered that once the requisite amount, e. g. about 2.5% based on the solids content weight of the latex, of zinc oxide is added to the latex composition, a satisfactory product is not obtained unless all three conditions for stabilization are met: i. e. the presence of the sequestering agent for polyvalent zinc ions, high pH, and low or no (for example with synthetic latex) ammonia content. We have further discovered that with latices having 50% or more by weight of natural rubber, the above conditions must be met and in addition there must be present in the latex foam a castor oil soap; and although we have no explanation for the result, we have tried without success to substitute for the castor oil soap a number of other soaps and stabilizing agents, including oleate, stearate, linoleate and resin soaps, polyether alcohols, sulfated fatty alcohols. In each such attempt, the latex coagulated prematurely or the foam broke down, resulting in an inferior product. It thus appears that castor oil soap is specific to the process where natural rubber latex is present in quantities of 50 per cent or more.

The precaution of maintaining the ammonia content at a low value between .1% and .5% and preferably at less than .2% of the solids is of course necessary only when ammonia is present in the compound, as for example when the latex is a natural ammonia-preserved latex, or when ammonia or ammonia-containing compounding ingredients are added. The ammonia may be removed in conventional manner, as by permitting it to volatilize, and venting it from the latex container, or by reaction with formaldehyde. The pH can be raised to the desired value by conventional means. Generally, synthetic rubber latices are not ammonia-stabilized, although ammonia-containing stabilizers and sensitizers may be added.

Examples of the gelling agents which may be used in practicing this invention are the conventional slightly soluble salts of fluosilicic acid, for example, sodium or potassium silicofluoride, referred to herein as "silicofluorides," these salts being slightly soluble in water. Among the "sequestering agents for polyvalent zinc ions," which term is used in its commonly accepted meaning as a material which will remove polyvalent zinc ions from a solution as by precipitating or insolubilizing the zinc, or by forming relatively soluble but un-ionized compounds, are alkali carbonate, borate, including tetraborate, phosphate, including metaphosphate, sulfite, oxalate, ferrocyanide, ferricyanide, chromate. The term "alkali" referring to such materials is used in its commonly accepted sense as inclusive of ammonium and alkali-metal salts but exclusive of the alkali-earth or other polyvalent metal salts. Among the castor oil soaps which may be used are potassium castor oil soap (potassium ricinoleate) and sulfonated castor oil soaps. The quantities of the individual compounding ingredients are not particularly critical, except that it is important to maintain the ammonia content at between .1% and .5%, and preferably less than .2% based on the total solids weight of the latex, and the pH at least 10. The amount of zinc sequestering agent may vary between .3 and 5 parts by weight per 100 parts solids. The amount of sequestering agent depends on the type of latex used and on the particular sequestering agent used. The amount of zinc oxide is generally between 2 and 10 parts based on 100 parts solids content. The amount of silicofluoride may vary between .6 and 4 parts per 100 parts of solids content of the latex foam, depending upon the stability of the latex and the time to be required for the shaping or pouring operation before gelling takes place.

The present invention is particularly adapted to the continuous preparation of sponge rubber from synthetic rubber latices which, in general, are very sensitive to metallic divalent ions. Natural rubber latex, alone or admixed with synthetic rubber latex, may also be used. In the preparation of the synthetic rubber latex, as is known, polymerizable monomeric compounds are emulsified in an aqueous medium by means of an emulsifying agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, 2,3 - dimethylbutadiene - 1,3. The polymerizable material as known may be a mixture of such a butadiene-1,3 with another polymerizable compound which is capable of forming a rubber copolymer with butadienes-1,3, for example, up to 70 per cent of such mixture of a compound which contains a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubber latices of the above types are an aqueous emulsion polymerizate of chloro-2-butadiene-1,3, known as neoprene latex, aqueous emulsion polymerizates of mixtures of butadiene-1,3 and styrene to form copolymer dispersions, known as GR-S latex, and aqueous emulsion polymerizates of mixtures of butadiene-1,3 and acrylonitrile to form copolymer dispersions, known as GR-N latex.

*Example 1*

A latex composition of the following composition was whipped into a foam in conventional manner:

| Ingredients | Parts by Weight | |
| --- | --- | --- |
| | Wet | Dry |
| GR-S latex (58% solids) | 172.4 | 100.00 |
| Potassium castor oil soap | 2.6 | 0.9 |
| Sodium hexametaphosphate | 2.5 | 0.5 |
| Sulfur | 5.8 | 3.5 |
| Accelerator | 2.5 | 1.25 |
| Antioxidant | 2.0 | 1.0 |
| Sensitizer (triamine base) | 0.7 | 0.2 |
| Zinc Oxide | 4.2 | 2.5 |

The GR-S latex was a commercial emulsion polymerizate of equal parts by weight of butadiene-1,3 and styrene containing about 6 percent, by weight, based on the water phase, of soap as emulsifying agent. The original concentration of the latex was increased to 58% solids content by conventional means. After whipping the foam to the desired foam density of .14 gram per cubic cm., five parts by wet weight of a twenty-five percent sodium silicofluoride aqueous paste was thoroughly mixed in. The foam was poured into molds and became gelled in approximately 7 minutes at room temperature (about 70° F.). After the foam had gelled, the molds were heated at 212° F. for one-half hour to vulcanize the gelled mass to rubber sponge. The sponge was then removed from the molds, washed, and dried. The density of the final sponge was .12 gram per cubic cm.

Example 2

A latex composition of the following formulation was whipped into a foam in conventional manner:

| Ingredients | Parts by Weight | |
|---|---|---|
| | Wet | Dry |
| GR-S latex (58% solids) | 86.2 | 50.0 |
| Natural rubber latex (58% solids) | 86.2 | 50.0 |
| Potassium castor oil soap | 2.8 | 1.0 |
| Sodium hexametaphosphate | 2.5 | 0.5 |
| Frothing soap (Potassium oleate) | 4.5 | 0.9 |
| Sulfur | 5.0 | 3.0 |
| Accelerator | 3.1 | 1.5 |
| Antioxidant | 2.0 | 1.0 |
| Sensitizer (triamine base) | 0.7 | 0.2 |
| Zinc Oxide | 6.6 | 3.0 |

The above compound was frothed as described above and four parts by wet weight of a twenty-five percent sodium silicofluoride aqueous paste were added after the foam had acquired the desired density of .14 gram per cubic cm. The foam was then poured into molds, gelling was permitted to take place, and the sponge rubber article was vulcanized, washed, and dried. Density of the rubber was .12 gram per cubic cc.

In view of the many changes and modifications that may be made without departing from the principles underlying the invention, reference should be made to the appended claims for an understanding of the scope of protection afforded the invention.

Having thus described our invention, what we claim and desire to protect by Letters Patent is:

1. The method of making sponge rubber from latex selected from the group consisting of synthetic rubber latices comprising aqueous emulsion polymerizates of polymerizable material selected from the group consisting of butadienes-1,3 and mixtures of butadienes-1,3 with compounds which contain a $CH_2=C<$ group and are copolymerizable with butadienes-1,3, and mixtures of natural rubber latex with such synthetic rubber latex in amount up to equal part by weight of the solids of the natural latex based on the solids of the synthetic rubber latex, which comprises whipping into a foam such a latex having a pH of at least 10, and containing not more than 0.5% of ammonia, 2 to 10 percent of zinc oxide, and 0.3 to 5 percent of a zinc sequestering agent of the group consisting of alkali carbonates, borates, phosphates, sulfites, oxalates, ferrocyanides, ferricyanides and chromates, said percentages being based on the weight of the solids content of the latex, thereafter adding a gelling agent to the latex foam, shaping the foam before gelling takes place, permitting the foam to gel, and vulcanizing to form sponge rubber.

2. The method of making sponge rubber from latex selected from the group consisting of synthetic rubber latices comprising aqueous emulsion polymerizates of polymerizable material selected from the group consisting of butadienes-1,3 and mixtures of butadienes-1,3 with compounds which contain a $CH_2=C<$ group and are copolymerizable with butadienes-1,3, and mixtures of natural rubber latex with such synthetic rubber latex in amount up to equal part by weight of the solids of the natural latex based on the solids of the synthetic rubber latex, which comprises whipping into a foam such a latex having a pH of at least 10, and containing not more than 0.5% of ammonia, 2 to 10 percent of zinc oxide, and 0.3 to 5 percent of a zinc sequestering agent of the group consisting of alkali carbonates, borates, phosphates, sulfites, oxalates, ferrocyanides, ferricyanides and chromates, said percentages being based on the weight of the solids content of the latex, thereafter adding slightly soluble salt of fluosilicic acid to the foam, shaping the foam before gelling takes place, permitting the foam to gel, and vulcanizing to form sponge rubber.

3. The method of making sponge rubber from latex selected from the group consisting of synthetic rubber latices comprising aqueous emulsion polymerizates of polymerizable material selected from the group consisting of butadienes-1,3 and mixtures of butadienes-1,3 with compounds which contain a $CH_2=C<$ group and are copolymerizable with butadienes-1,3, and mixtures of natural rubber latex with such synthetic rubber latex in amount up to equal part by weight of the solids of the natural latex based on the solids of the synthetic rubber latex, which comprises whipping into a foam such a latex having a pH of at least 10, and containing not more than 0.5% of ammonia, 2 to 10 percent of zinc oxide, and 0.3 to 5 percent of a zinc sequestering agent of the group consisting of alkali carbonates, borates, phosphates, sulfites, oxalates, ferrocyanides, ferricyanides and chromates, said percentages being based on the weight of the solids content of the latex, thereafter adding to the latex foam 0.6 to 4 percent of sodium silicofluoride based on the weight of the solids content of the latex, shaping the foam before gelling takes place, permitting the foam to gel, and vulcanizing to form sponge rubber.

4. The method of claim 1 in which the latex used consists of an emulsion polymerizate of butadiene-1,3 and styrene.

5. The method of claim 2 in which the latex used consists of an emulsion polymerizate of butadiene-1,3 and styrene.

6. The method of claim 3 in which the latex used consists of an emulsion polymerizate of butadiene-1,3 and styrene.

EDWARD C. VAN BUSKIRK.
PAUL V. BUTSCH.

REFERENCES CITED

The following references are of record in the file of this patent:

UNITED STATES PATENTS

| Number | Name | Date |
|---|---|---|
| 1,852,447 | Chapman | Apr. 5, 1932 |
| 2,261,439 | Kelly | Nov. 4, 1941 |
| 2,290,622 | Carter | July 21, 1942 |
| 2,313,463 | Clayton et al. | Mar. 9, 1943 |
| 2,336,944 | Madge et al. | Dec. 14, 1943 |